United States Patent [19]

Cockman

[11] 4,226,815
[45] Oct. 7, 1980

[54] COOLING APPARATUS

[76] Inventor: Haggie I. Cockman, P.O. Box 1600, Sanford, Fla. 32771

[21] Appl. No.: 95,352

[22] Filed: Nov. 19, 1979

[51] Int. Cl.³ .............................................. B01F 3/04
[52] U.S. Cl. .................................. 261/110; 239/383; 210/150; 261/109; 261/119 R; 261/DIG. 11; 261/DIG. 79
[58] Field of Search ............................... 261/109–112, 261/25, 89, DIG. 11, DIG. 77, DIG. 79, 114 R, 119 R, 120; 239/219, 224, 282, 383, DIG. 1; 210/150, 151, 242 A

[56] References Cited

U.S. PATENT DOCUMENTS

| | | | |
|---|---|---|---|
| 2,606,008 | 8/1952 | Lau Bach | 261/DIG. 11 |
| 3,079,092 | 2/1963 | Meek | 261/112 X |
| 3,081,987 | 3/1963 | Meek et al. | 261/112 |
| 3,363,885 | 1/1968 | Meek | 261/DIG. 11 |
| 3,493,216 | 2/1970 | Johnson | 261/112 X |
| 3,610,527 | 10/1971 | Ericson et al. | 239/383 X |
| 3,864,442 | 2/1975 | Percy | 261/DIG. 11 |
| 3,917,759 | 11/1975 | Martin | 261/112 X |
| 3,947,532 | 3/1976 | Skold et al. | 261/112 |
| 4,156,705 | 5/1979 | Ogawa et al. | 261/112 X |

FOREIGN PATENT DOCUMENTS

| | | | |
|---|---|---|---|
| 103160 | 11/1962 | Netherlands | 239/383 |
| 1196746 | 7/1970 | United Kingdom | 239/383 |

*Primary Examiner*—Richard L. Chiesa
*Attorney, Agent, or Firm*—Duckworth, Hobby, Allen & Pettis

[57] ABSTRACT

A liquid cooling apparatus having a multi-level terraced structure capped by a central cooling tower. The central cooling tower has one or more non-clogging liquid spray nozzles mounted therein for spraying the liquid in the tower while compressed air is fed into the bottom of the tower into the sprayed liquid. The liquid collects on the terraced structure which has a plurality of channels formed therein having baffles mounted to break up the flow of water as it passes over each level of the terraced structure. Flow paths on the terraced structure may also have rocks placed along the channels between the baffling members.

17 Claims, 8 Drawing Figures

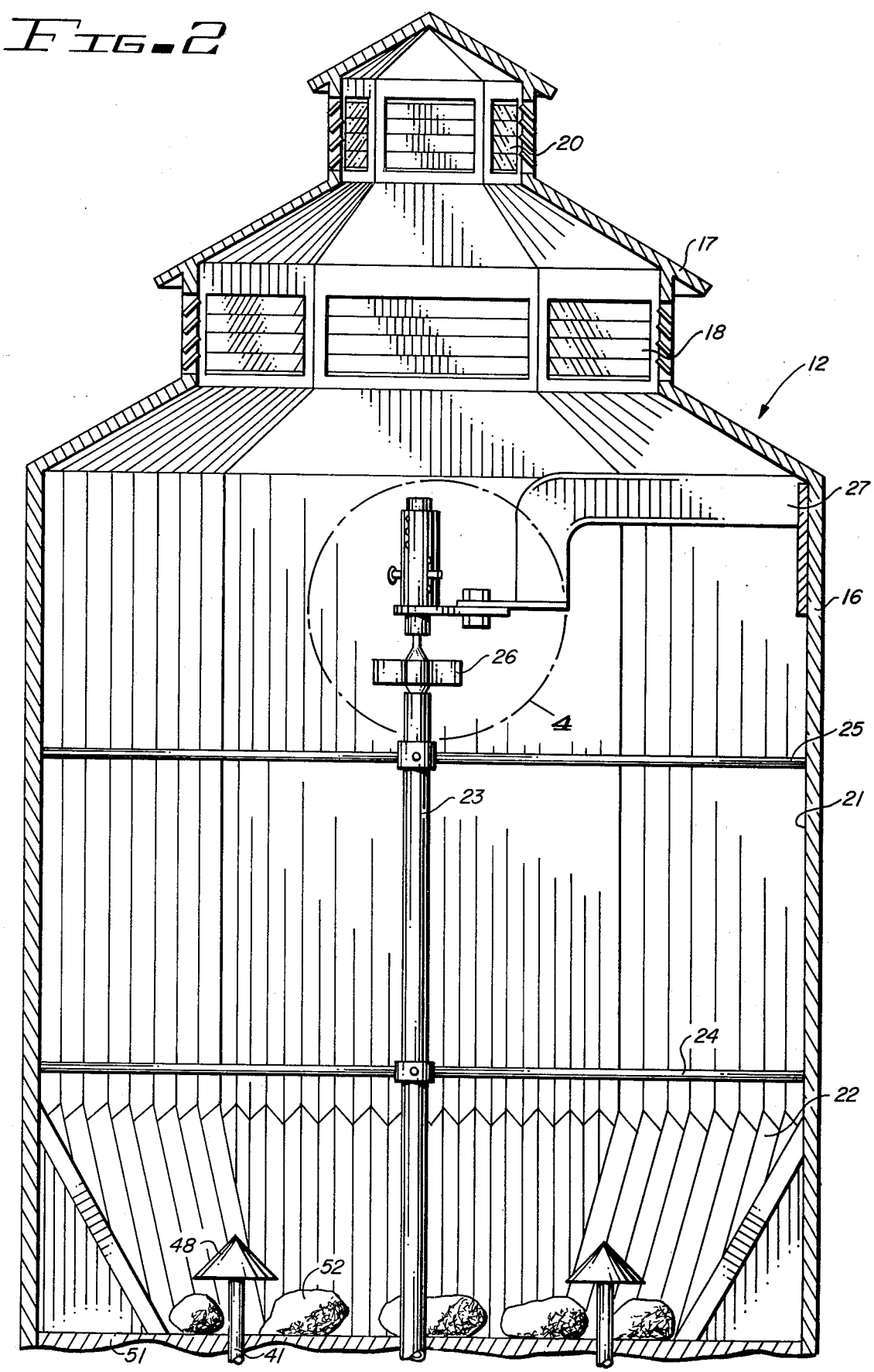

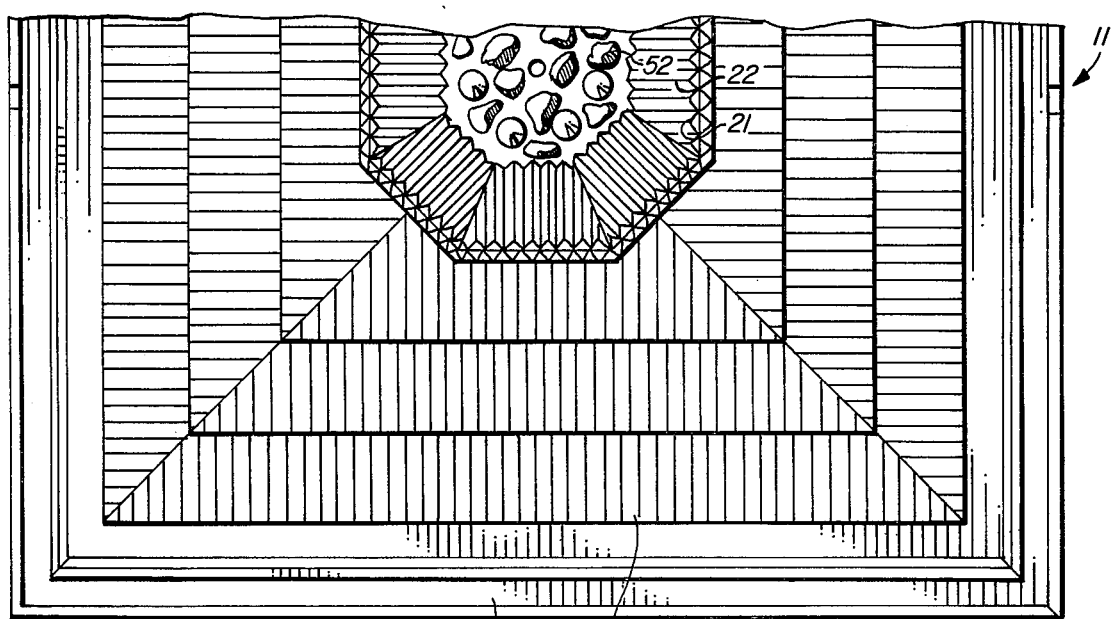
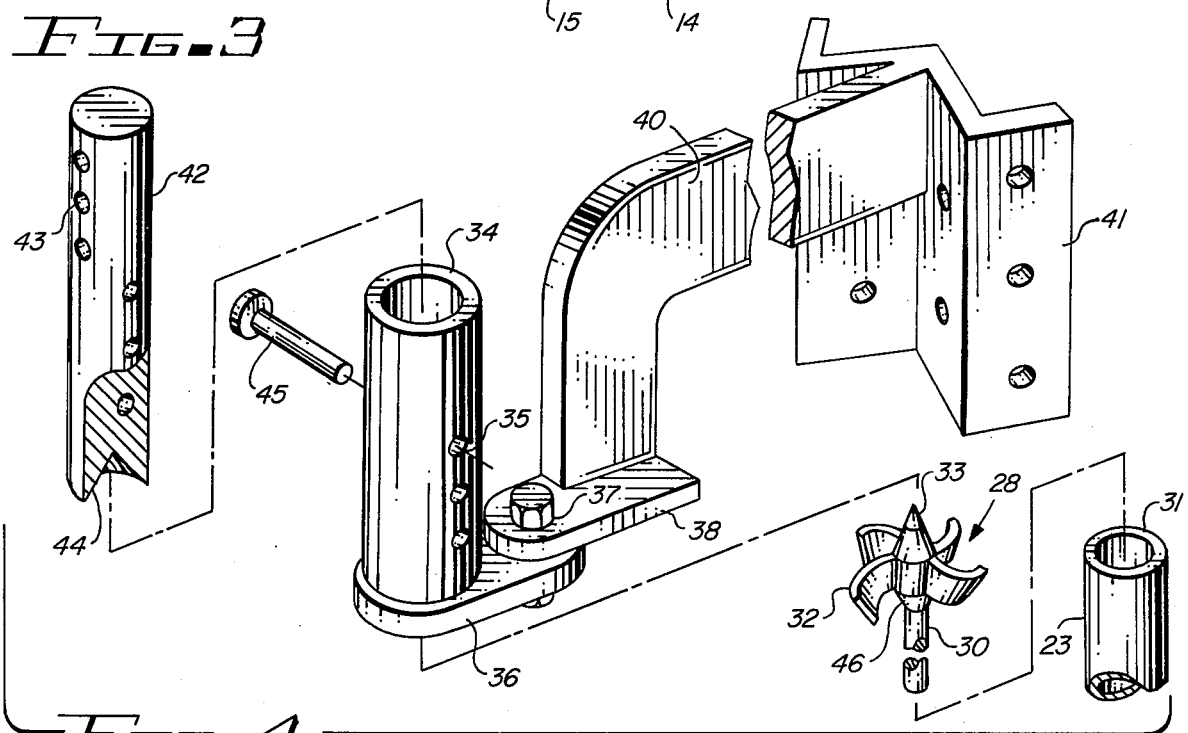
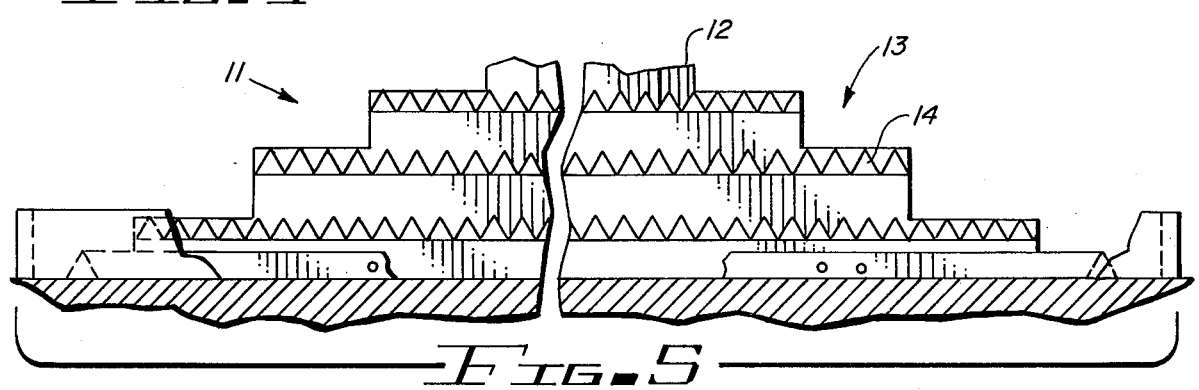

COOLING APPARATUS

BACKGROUND OF THE INVENTION

The present invention relates to liquid cooling devices and especially to cooling towers adapted to cool and aerate large volumes of water.

In the past, various types of liquid cooling towers have been used for heat exchangers for cooling the liquid which has been heated in industrial processes, such as in air conditioning equipment. Such cooling towers typically utilize water which is fed to the top of a tower and allowed to fall through the tower where it may be broken up so as to cool the water by the water-/air contact with the ambient air passing through the tower.

A typical prior art cooling tower can be seen in U.S. Pat. No. 2,606,008 to Laubach. A more recent cooling system can be seen in U.S. Pat. No. 3,864,442 in which a tower is mounted over a liquid reservoir, and in which a conduit discharges a liquid through a discharge nozzle to provide a downward spray of the cooling water which precipitates into a reservoir. Contra air flow is induced through the cooling water to assist in the cooling, and baffle plates are located in the reservoir to direct the cooling water over conduits of the heat exchanger.

The present invention, on the other hand, sprays a cooling liquid into a cooling tower through a special nonclogging spray nozzle for producing a better atomization of the liquid and utilizes forced air both against the collected liquid and passing through the tower. The tower forms only one part of the cooling system which is mounted on a terraced structure to increase the cooling operation of the liquid as it trickles over the terraced structure along grooves having baffles or retarders and rocks thereon.

SUMMARY OF THE INVENTION

A liquid cooling system having a multi-level terraced structure forming a plurality of liquid flow paths over each level of the structure, with each grooved flow path on each level having baffling thereon, and also being adapted for rocks to break up the flow of the liquid. A central tower is mounted on top of the top level of the terraced structure, which tower has an open top but closed sides, and one or more non-clogging spray nozzles mounted therein to spray liquids being cooled into the tower. Cooling air is forced under pressure through pipes opening in the bottom of the cooling tower into cones which direct the forced air against liquid collectng on the bottom of the cooling tower where the air is then directed up through the cooling tower contra to the falling spray and out the top of the cooling tower. The liquid spray nozzles include a rapidly spinning deflector member having vanes thereon for spraying and breaking up the liquid being sprayed in the tower.

BRIEF DESCRIPTION OF THE DRAWINGS

OTher objects, features and advantages of the present invention will be apparent from the written description and the drawings, in which:

FIG. 2 is a sectional view of the cooling tower of a cooling system in accordance with FIG. 1;

FIG. 3 is a sectional view of the cooling system taken through the cooling tower;

FIG. 4 is an exploded view of the spray nozzle and the support bracket taken on the circle 4 of FIG. 2;

FIG. 5 is a fragmentary sectional view of the terraced structure of the cooling system;

DESCRIPTION OF THE PREFERRED EMBODIMENTS

Figure 8:
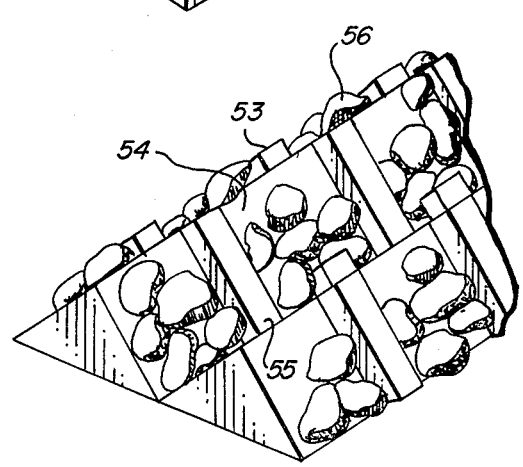
FIG. 8 is a fragmentary sectional view of the liquid paths for the terraced structure having baffles located therein.

Referring to the drawings, and especially to FIGS. 1 through 6, a cooling system 10 can be seen to have a terraced base structure 11 and a cooling tower 12 mounted on top of the base structure 11. The structure 11 may typically be a concrete structure having a series of terraced levels 13 each having a plurality of grooved liquid paths 14 formed in the shape of a series of elongated Vs, forming an accordionlike structure. The terraced structure 11 can be set in a reservoir 15 of liquid if desired or can be collected and directed off to a separate reservoir. In operation, the liquid is sprayed in the cooling tower 12 and collects on the uppermost terrace 13 and follows the flow paths 14 as it moves from one terrace to the next. The grooved liquid flow paths 14 may have baffles or retarders, as shown in FIG. 8 to break up the flow of water, and may include rocks thereon, as also shown in FIG. 8. The cooling system advantageously not only cools the liquid, but aerates and treats it much like a trickle filter in a sewage treatment system flowing around a large number of baffles and rocks.

The cooling tower 12 has outside wall 16 and a roof section 17, having a plurality of slotted openings 18 and a plurality of slotted openings 20. Inside the walls 16, the interior surface may be formed of a plurality of V-shaped grooves 21 which may have an inwardly angled V-grooved wall 22 on the bottom portion of the tower 12 for directing liquid that is thrown against the walls toward the bottom of the tower. A liquid input line 23 directs liquid to be cooled through the structure 11 into the tower 12, which pipe is supported by lower support bracket 24 and upper support bracket 25. A non-clogging liquid distribution nozzle 26 is mounted on the end of the pipe 23, which nozzle may be supported by nozzle support bracket 27 attached to the side 16. The nozzle and support bracket may be more clearly seen in FIG. 3, in which the pipe 23 has a spinning nozzle element 28 having a shaft 30 which fits into the pipe end 31 of the water pipe 23 and has a plurality of curved vanes 32 thereon and a top supporting member 33. The top support 33 is of a generally pointed shape with a curved tip and is positioned inside of a sleeve 34. Sleeve 34 has a plurality of holes 35 passing therethrough and is attached to base bracket member 36 which in turn is bolted with a bolt 37 to a bracket member 38 connected to an arm 40 which in turn is connected to a bracket 41 which is attached to the sides 16 of the cooling tower. The sleeve 34 has a weighted rod 42 having a plurality of openings 43 passing therethrough and has a cone shaped opening 44. The bar member 42 rides in the sleeve 34 so that the cone 44 engages the tip 33 of the spray nozzle 28, thereby centering the spray nozzle 28. A pin 45 may be passed through the openings 35 of the sleeve 34 and through the openings 43 of the rod 42 to position the rod 42 in the sleeve 34 for predetermined adjustments for holding the rotating nozzle member 28. In addition, the sleeves 34 may be enlarged openings with sufficient slack to vary the pressure applied against the tip 33 of the nozzle member 28.

Liquid passing out of the pipe 23 is directed against the vanes 32 spinning the vanes 32 which spray water similar to certain types of lawn and irrigation sprinkler systems except that the head is designed to distribute a very fine spray of liquid adjusted for the pressure being applied to the liquid leaving the pipe 23. When liquid is not flowing out of the pipe 23, an angled support 46 on the shaft 30 is shaped to be supported by the lip 31 of the pipe 23. The raising of the spray nozzle 28 when water under pressure is applied thereagainst along with the simultaneous spinning prevents clogging in the nozzle head. The discharge sprinkler member 28 is centered by the connection between the point 33 and the cone 44 and the rod 42 and by the gyroscopic action of the spinning. The sprayed liquid falls in the tower 12 except for small portions that may be thrown against the interior surface 21 of the walls 16, which will flow down the grooved walls.

Figure 1:
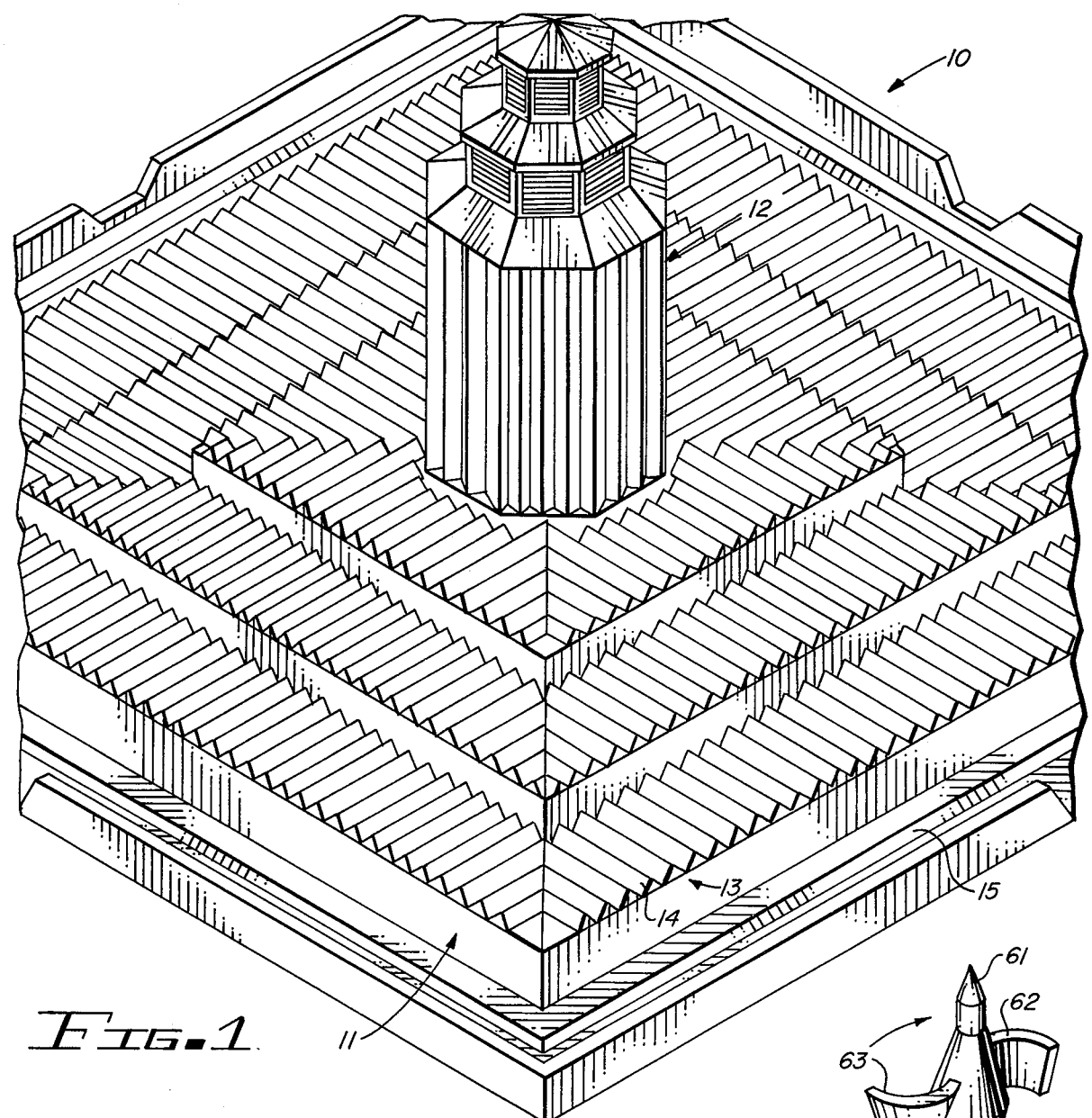
FIG. 1 is a partial perspective view of a cooling system in accordance with the present invention.
Figure 6:
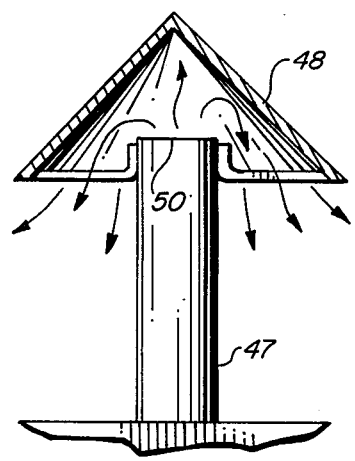
FIG. 6 is a sectional view of the air nozzles for the cooling tower.

A plurality of air lines 47 have cone-shaped heads 48 mounted to the ends 50 thereof and pass through a bottom member 51 of the cooling tower 12. The air under pressure is fed, as shown in FIG. 6, out the line 47 directed into the cones 48 downwardly towards the water accumulating on the bottom 51 of the cooling tower 12 and adjacent rocks 52 located on the bottom of the cooling tower 12. The air is then directed upward within the enclosed walls 16 contra to the flow of the sprayed water from the spray nozzle 26. The flowing air not only cools the finely divided water particles, but aerates the water as well. The air under pressure is directed out the openings 18 and 20 of the roof section 17.

Figure 7:
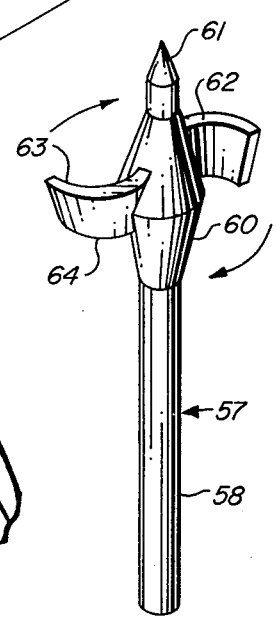
FIG. 7 is a perspective view of a second embodiment of a rotating element of the liquid discharge nozzle.

The cooled liquid from cooling tower 12, which collects on the bottom of the cooling tower, then flows out along the top level of the terraced structure through the V-shaped grooved liquid flow paths, and from one terraced level to the next, and then back into a central reservoir. In FIG. 8, an alternate embodiment of the grooves 14 has a plurality of alternately spaced baffles 52 are spaced against one inverted V wall 54 on one side and on the wall 55 on the other side. A plurality of rocks 56 can be interspaced between the baffles 53 to break up the flow path and to treat the water as it flows over the terraced structure. FIG. 7 shows an alternate rotating water nozzle element 57 having a shaft 58, an angled support 60, a pointed upper support 61 and a pair of curved vanes 62 which curved vanes have an arcuate curve 63 and are angled along their walls 64 for distribution of the liquid leaving inlet liquid pipe 23.

It should be clear at this point that a cooling system has been provided which both cools and treats liquids, such as water, but it should also be clear that other liquids could be cooled and treated in a similar manner without departing from the spirit and scope of the invention. Accordingly, the present invention is not to be construed as limited to the forms shown, which are to be considered illustrative rather than restrictive.

I claim:

1. A liquid cooling apparatus comprising in combination:

a multi-level terraced structure forming a plurality of flow paths over each level thereof for the flow of a liquid from one level to the next lower level of each level of said terraced structure;

a central tower mounted on the top level of said terraced structure;

liquid input means connected to a source of liquid and leading into said central tower;

at least one liquid spray head mounted in said central tower to said liquid input means for spraying liquid being fed from said liquid input means into said central tower; and air feed means for feeding air under pressure into said central tower beneath said sprayed liquid being dispersed from said liquid spray head whereby liquid entering said central tower through said liquid input means is cooled and aerated.

2. The apparatus in accordance with claim 1 in which said air feed means includes at least one air line entering said central tower and has a cone mounted over the output from said air line to direct the air under pressure downwardly from the interior of said cone.

3. The apparatus in accordance with claim 2, in which said air feed means includes a plurality of air lines entering said central tower, each having a cone mounted over the output thereof for directing air from said air line.

4. The apparatus in accordance with claim 3, in which said central tower has a plurality of rocks along the base thereof and said air lines protrude above said rocks.

5. The apparatus in accordance with claim 1, in which said multi-level terraced structure plurality of flow paths each has a plurality of baffles therein for directing the flow of water therethrough.

6. The apparatus in accordance with claim 5, in which each flow path having baffles mounted thereon also has a plurality of rocks placed between said baffles.

7. The apparatus in accordance with claim 6, in which said central tower is enclosed with walls and has a roof portion thereover, said roof portion having a plurality of openings therein for the escape of air from said air feed means.

8. The apparatus in accordance with claim 7, in which said central tower walls have a plurality of flow defining paths on the interior side thereof.

9. The apparatus in accordance with claim 7, in which said central tower interior wall has an angled bottom wall having a plurality of connected flow paths for directing falling liquid in said central tower.

10. The apparatus in accordance with claim 1, in which said liquid spray head has a rotating nozzle member mounted on the end of a liquid input line for spraying liquid being fed through said liquid input line.

11. The apparatus in accordance with claim 10, in which said liquid spray head rotating nozzle member has curved vanes mounted thereon for creating a predetermined spray pattern.

12. The apparatus in accordance with claim 11, in which said liquid spray head includes a nozzle sleeve mounted over said nozzle spray member and a nozzle support member mounted in said sleeve for contact with said rotating nozzle member.

13. The apparatus in accodance with claim 12, in which said nozzle member has a generally pointed end portion coacting with an inverted cone formed in the end of said nozzle support member for rotating thereon.

14. The apparatus in accordance with claim 13, in which said liquid spray head nozzle sleeve has apertures therethrough and said nozzle support member in said nozzle sleeve has apertures therethrough for locking said nozzle support member and nozzle sleeve with a locking pin passing through said apertures.

15. The apparatus in accordance with claim 14, in which said nozzle sleeve is connected through a support bracket to said central tower wall.

16. The apparatus in accordance with claim 1, in which said liquid input means has a plurality of liquid spray heads mounted in said central tower.

17. The apparatus in accordance with claim 16, in which said flow paths are formed by an accordion like structure having elongated pointed ridges along each level of said multi-level terraced structure.

* * * * *